3,849,458
METHOD FOR DEUTERATING ORGANIC COMPOUNDS
Nguyen Dinh-Nguyen and Einar August Stenhagen, Molndal, Sweden, assignors to Incentive Research Development AB, Bromma, Sweden
No Drawing. Continuation of abandoned application Ser. No. 522,030, Jan. 21, 1966. This application Sept. 16, 1968, Ser. No. 768,950
Int. Cl. C07c 53/22
U.S. Cl. 260—413        9 Claims

ABSTRACT OF THE DISCLOSURE

In the known process of deuterating an organic chemical compound containing hydrogen, involving the replacement of hydrogen by deuterium, from a source of heavy hydrogen, with the aid of an alkali and a platinum metal catalyst, the exchange of deuterium for hydrogen can be significantly promoted if the deuterating operation is carried out in the presence of a promoter consisting of deuterium peroxide.

---

This application is a continuation of Ser. No. 522,030, filed Jan. 21, 1966, and now abandoned.

Several methods for the synthesis of organic compounds containing heavy isotopes of hydrogen have been described previously but none of them is a general method for the production of various types of organic compounds having a high content of a heavy hydrogen isotope. The earlier methods have only allowed a complete replacement of hydrogen by deuterium in a number of compounds of low molecular weight, whereas a direct and complete replacement in compounds of high molecular weight has been completely unsuccessful. The present invention constitutes a general process through which such replacement of light hydrogen by heavy hydrogen isotopes can be carried out in a great many organic compounds including compounds of high molecular weight. The new process can be used not only for the small scale production of heavy hydrogen containing compounds for scientific purposes but also on an industrial scale.

The invention is based on a direct exchange of light hydrogen in organic compounds by deuterium using a suitable source of heavy hydrogen (for instance, deuterium oxide).

In earlier attempts to replace light hydrogen by deuterium, organic compounds have been treated with heavy water in the presence of alkali and a platinum catalyst. This allows the replacement of especially labile hydrogen atoms but does not constitute a general method for the complete exchange of all the hydrogen atoms in compounds of high molecular weight. Our work has shown that an additional catalyst (here called promoter) for the reaction must also be present.

The process according to the invention thus involves a direct exchange reaction between an organic compound containing light hydrogen and a source of heavy hydrogen, such as deuterium oxide, in the presence of alkali and a metal catalyst, and is characterized by the addition of deuterium peroxide as reaction promoter.

The process according to the invention can be used for the production of, for instance, completely deuterated (perdeuterated) fatty acids, dicarboxylic acids, ketones, alcohols and hydrocarbons of diverse types, and is therefore of wide applicability. The process has been used for the preparation of deuterium-containing compounds of high isotopic purity (over 99 percent), isotopic purity being limited only by the isotopic purity of the deuterium source. The general procedure used for the exchange reaction is briefly as follows.

The initial compound (organic compound containing light hydrogen) is heated in a solution of alkali-deuteroxide in deuterium oxide in the presence of deuterium peroxide and a metal catalyst (such as Adams platinum catalyst). The heating is performed in a closed vessel under continuous shaking. The deuterated compounds are isolated from the reaction mixture by conventional methods. The metal catalyst can be recovered and reconverted to active form. The alkali base metal can also be recovered, if necessary.

Several factors are of the importance for the extent of exchange, in a single run, including the temperature, the relative amount of catalyst, and the time of heating. The nature of the metallic catalyst and the structure of the organic compound are of course also important.

Among the several metallic catalysts studied, Adams well known platinum oxide catalyst has been found very suitable on account of the high activity of its deuterium-reduced form, obtained through reduction of [$PtO_2 \cdot H_2O$] in suspension in $D_2O$ by means of deuterium gas.

The alkali-deuteroxide and the deuterium peroxide can be prepared together through the reaction of the peroxide of the metal and deuterium oxide. The use of granulated sodium peroxide is convenient. In the reaction of sodium peroxide with heavy water sodium deuteroxide the alkali catalyst and deuterium peroxide (the promoter) are formed in equivalent amounts, but other relations between basic catalyst and promoter can of course be used.

In preparation of perdeuterated organic compounds in small amounts heavy-walled reaction tubes of a resistant glass such as Pyrex can be used, but the tubes should be used only once. Preparation on a larger scale requires heated high-pressure vessels with inert inner surfaces. In the former case the tubes in the thermostated oven are placed in an effective shaking machine, in the latter suitable means for effective stirring of the contents of the reaction vessel must be provided.

The following examples show the application of the new process to the preparation of perdeuterated compounds of different types. Throughout the process care should be taken to avoid isotope dilution. Parts are by weight.

EXAMPLE 1

Perdeuteriooctadecanoic acid

Preparation of the metal catalyst.—24.5 parts of Adams catalyst ($PtO_2 \cdot H_2O$) and 100 parts of heavy water (99.78% $D_2O$ from Norsk Hydro), are introduced in the reaction vessel. After removal of air by evacuation deuterium gas is admitted and the vessel shaken until the platinum oxide has been completely reduced.

Preparation of alkali catalyst and promoter.—15.5 parts of granular sodium peroxide ($Na_2O_2$ pro analysi from E. Merck AG), are cautiously added, in small portions, to 1000 parts of heavy water, with cooling. The resulting solution contains theoretically 16.4 parts of sodium deuteroxide and 7.2 parts of deuterium peroxide, which are, respectively, the alkali catalyst and the promoter The exchange reaction.—After introducing successively 57 parts of n-octadecanoic (stearic) acid, the solution of alkali catalyst and promoter, and 400 parts of heavy water into the reaction vessel containing the aforesaid deuterium-reduced platinum metal catalyst, the system is frozen in Dry Ice, air removed by evaporation and the vessel hermetically closed.

The system is heated to 240°, and kept at this temperature for 28 hours under vigorous shaking. After cooling the vessel is opened, and the resulting non-homogeneous mixture is stirred until homogeneous. The water (mixture of $H_2O$, HDO and $D_2O$) is evaporated in vacuo at room temperature.

To the dry powdered residue kept in the reaction vessel another portion of 1500 parts of heavy water is added, and the vessel is closed after evacuation. This second exchange reaction is executed under the same conditions as that of the first one just described. After evaporating off the water to dryness and acidification with dilute hydrochloric acid the organic phase is extracted with ether. The crude product was chromatographed on a silicic acid column.

57 parts (90 percent of the theoretical amount) of perdeuteriooctadecanoic acid are thus obtained. Mass spectrometric analysis of the methyl ester showed that the acid had an isotopic purity of >98%.

The synthesis can be summarized as follows:

TABLE I

| Compounds | M | Molecular ratios | Parts by weight |
|---|---|---|---|
| $CH_3-(CH_2)16-COOH$ | 284.468 | 2 | 57 |
| $D_2O$ | 20.028 | 1,500 | 3,000 |
| $Pt_2O:H_2O$* | 245.246 | 1 | 24.5 |
| Pt | 195.09 | 1 | (19.5) |
| $Na_2O_2$* | 77.994 | 2 | 15.5 |
| NaOD | 41.011 | 4 | (16.4) |
| $D_2O_2$ | 36.028 | 2 | (7.2) |
| $CD_3-(CD_2)16-COOH$ | 319.678 | 2 | (63.8) 57 |

In the above and following tables, "M" represents "molecular weight," and "molecular ratios" represents "ratios of molecular amounts." In the columns marked "parts by weight" the figures not enclosed within parenthesis represents amounts actually used, whilst the total reaction time is 56 hours. The starting material for the catalyst and promoter are marked with an asterisk. The figures within parenthesis are theoretical (i.e., calculated) values.

EXAMPLE 2

Perdeuteriocamphor

Camphor contains three methyl groups whose hydrogen atoms are diffcult to exchange. In order to show the efficiency of the present process in a difficult case only one hydrogen-deuterium exchange was made. In the present case, the reaction product was extracted with anhydrous ether, from the reaction mixture. From 60.8 parts of camphor the process yields 62 parts of deuterated product—no by-products being detected by gas-chromatographic analysis. Mass-spectrometric analysis of this isoprenoid compound showed the presence of molecular $C_{10}D_{16}O$ but $C_{10}H_4D_{12}O$ was the most abundant specimen present. The overall exchange in this single run was about 78 percent, calculated from the mass spectrum.

The synthesis is summarized in the following table:

TABLE II

| Compounds | M | Molecular ratios | Parts by weight |
|---|---|---|---|
| $C_{10}H_{16}O$ | 152.228 | 4 | 60.8 |
| $D_2O$ | 20.028 | 1,000 | 2,000 |
| $PtO_2:H_2O$* | 245.246 | 1 | 24.5 |
| Pt | 195.09 | 1 | (19.5) |
| $Na_2O_2$* | 77.994 | 2 | 15.5 |
| NaOD | 41.011 | 4 | (16.4) |
| $D_2O_2$ | 36.028 | 2 | (7.2) |
| $C_{10}D_{10}O$ + analogues with lower deuterium content | 168.324 | 4 | (67.2) 62 |

EXAMPLE 3

Perdeuterioanthracene

The synthesis was performed under the same conditions as used for the preceding compounds. In the case of anthracene the hydrogen atoms are easy to exchange and a single run gives a fully deuterated product. Separation of the expected compound from the resulting mixture of exchange reaction was performed (after evaporating off water ($H_2O$, HDO, $D_2O$)) by extraction with dry benzene. The light yellow extract was then concentrated to a small volume by evaporation at room temperature, and heptane is added to precipitate the final deuteriated polycyclic hydrocarbon. 53.4 parts of anthracene thus yielded 48 parts (85 percent) of perdeuterioanthrancene of high isotopic purity, as shown by mass spectrometric analysis (>99 percent).

The synthesis is summarized in the following table:

TABLE III

| Compounds | M | Molecular ratios | Parts by weight |
|---|---|---|---|
| $C_{14}H_{10}$ | 178.220 | 3 | 53.4 |
| $D_2O$ | 20.028 | 1,000 | 2,000 |
| $Pt_2O:H_2O$* | 245.246 | 1 | 24.5 |
| Pt | 195.09 | 1 | (19.5) |
| $Na_2O_2$* | 77.994 | 2 | 15.5 |
| NaOD | 41.011 | 4 | (16.4) |
| $D_2O_2$ | 36.028 | 2 | (7.2) |
| $C_{14}D_{10}$ | 188.280 | 3 | (56.4) 48 |

We claim:

1. In the method of deuterating an organic compound containing hydrogen atoms replaceable by deuterium wherein said compound is reacted with heavy water as a deuterium source in the presence of alkali metal deuteroxide and a deuterium reduced Adams catalyst ($PtO_2H_2O$), the improvement which consists in carrying out the deuterating reaction in the presence of deuterium peroxide.

2. In the method of deuterating an organic compound containing hydrogen atoms replaceable by deuterium wherein said compound is reacted with heavy water in the presence of sodium deuteroxide and a deuterium reduced Adams catalyst ($PtO_2H_2O$), the improvement which consists in carrying out the deuterating reaction in the presence of deuterium peroxide.

3. The improved method defined in claim 1, in which the deuteratable organic compound is a hydrocarbon.

4. The improved method defined in claim 1, in which the deuteratable organic compound is an alcohol.

5. The improved method defined in claim 1, in which the deuteratable organic compound is a ketone.

6. The improved method defined in claim 1, in which the deuteratable organic compound is a fatty acid.

7. The improved method defined in claim 1, in which the deuteratable organic compound is camphor.

8. A method as claimed in claim 2 in which the platinum metal catalyst is produced by reducing a suspension of Adams catalyst ($PtO_2 \cdot H_2O$) in heavy water with deuterium.

9. The improved method defined in claim 2 in which the sodium deuteroxide (NaOD) and deuterium peroxide ($D_2O_2$) are prepared by reacting soidum peroxide with heavy water.

References Cited

C. A., 60, 11890g, abstract of Dinh-Nguyen Nguyen Arkiv Kemi, 22 (13), 151–67 (1964).

RAYMOND V. RUSH, Primary Examiner

U.S. Cl. X.R.

252—474; 260—586 R, 588, 590, 593 R, 617 R, 618 R, 632 R, 666 R, 668 R, A, B, C, D, 676 R